(12) United States Patent
Nordstrand et al.

(10) Patent No.: US 9,088,920 B2
(45) Date of Patent: *Jul. 21, 2015

(54) METHOD AND ARRANGEMENT IN A TELECOMMUNICATION SYSTEM

(71) Applicant: Telefonaktiebolaget L M Ericsson (publ), Stockholm (SE)

(72) Inventors: Ingrid Nordstrand, Sundbyberg (SE); Håkan Palm, Växjö (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,038

(22) Filed: Jan. 17, 2014

(65) Prior Publication Data
US 2014/0135012 A1    May 15, 2014

Related U.S. Application Data

(63) Continuation of application No. 13/128,471, filed as application No. PCT/SE2010/050667 on Jun. 15, 2010, now Pat. No. 8,660,088.

(60) Provisional application No. 61/248,583, filed on Oct. 5, 2009.

(51) Int. Cl.
*H04W 4/00* (2009.01)
*H04W 36/00* (2009.01)
*H04W 36/14* (2009.01)

(52) U.S. Cl.
CPC ...... *H04W 36/0083* (2013.01); *H04W 36/0038* (2013.01); *H04W 36/14* (2013.01)

(58) Field of Classification Search
CPC .................................................. H04W 36/0038
USPC .......................................... 455/411; 370/331
See application file for complete search history.

(56) References Cited

U.S. PATENT DOCUMENTS 8,036,664 B2 * 10/2011 Khetawat et al. ............. 455/436
8,331,906 B2   12/2012 Forsberg et al.
8,346,261 B2    1/2013 Iwamura et al.
8,442,535 B2    5/2013 Yang et al.
(Continued)

OTHER PUBLICATIONS

Japanese Office Action in corresponding Japanese Application No. 2014-000634 dated Sep. 24, 2014 with English Translation.
(Continued)

*Primary Examiner* — Khaled Kassim
*Assistant Examiner* — Syed S Ali
(74) *Attorney, Agent, or Firm* — Patent Portfolio Builders PLLC (57) ABSTRACT

The invention relates to a method and arrangement in a serving Radio Network Controller, SRNC for controlling inter RAT handover to E-UTRAN of a UE with E-UTRA capability operating in a serving network comprising said SRNC, wherein the SRNC receives, from a Serving GPRS Support Node, SGSN, security keys generated at authentication and key agreement, AKA, upon attachment of the UE to the serving network; characterized in the steps of—determining (202) which type of UICC the UE is equipped with by analyzing the security keys received from SGSN; —using the knowledge of which type of UICC the UE is equipped with to base a decision (204) on whether to allow handover of the UE to E-UTRAN.

12 Claims, 4 Drawing Sheets

(56) References Cited

U.S. PATENT DOCUMENTS

| | | | |
|---|---|---|---|
| 8,452,007 | B2 | 5/2013 | Gan et al. |
| 8,532,614 | B2* | 9/2013 | Somasundaram et al. .... 455/410 |
| 2003/0100291 | A1* | 5/2003 | Krishnarajah et al. ........ 455/410 |
| 2006/0196931 | A1 | 9/2006 | Holtmanns et al. |
| 2006/0294363 | A1 | 12/2006 | Bae et al. |
| 2007/0060097 | A1 | 3/2007 | Edge et al. |
| 2007/0157305 | A1 | 7/2007 | Dajiang |
| 2007/0249352 | A1 | 10/2007 | Song et al. |
| 2007/0297367 | A1* | 12/2007 | Wang et al. ................... 370/331 |
| 2008/0123851 | A1 | 5/2008 | Guccione et al. |
| 2009/0270064 | A1 | 10/2009 | Kunniyur et al. |
| 2009/0270099 | A1 | 10/2009 | Gallagher et al. |
| 2009/0316656 | A1 | 12/2009 | Zhao et al. |
| 2010/0002883 | A1* | 1/2010 | Sammour et al. ............. 380/272 |
| 2010/0054472 | A1 | 3/2010 | Barany et al. |
| 2010/0172500 | A1* | 7/2010 | Wu ................................ 380/272 |
| 2010/0180111 | A1* | 7/2010 | Hahn et al. .................... 713/150 |
| 2010/0228967 | A1* | 9/2010 | Hahn et al. .................... 713/155 |
| 2010/0330993 | A1 | 12/2010 | Kone |
| 2011/0004762 | A1 | 1/2011 | Horn |
| 2011/0009121 | A1 | 1/2011 | Yu et al. |
| 2011/0033053 | A1* | 2/2011 | Gan et al. ...................... 380/272 |
| 2011/0058480 | A1 | 3/2011 | Dahlen |
| 2011/0058531 | A1 | 3/2011 | Jain et al. |
| 2011/0090866 | A1 | 4/2011 | Yang |
| 2011/0092213 | A1* | 4/2011 | Forsberg et al. .............. 455/436 |
| 2011/0111731 | A1 | 5/2011 | Iwamura et al. |
| 2011/0123029 | A1 | 5/2011 | Zhang et al. |
| 2011/0188451 | A1 | 8/2011 | Song et al. |
| 2011/0201337 | A1 | 8/2011 | Forsberg et al. |
| 2011/0222690 | A1 | 9/2011 | Gan |
| 2011/0274090 | A1 | 11/2011 | Hallensal et al. |
| 2011/0280217 | A1 | 11/2011 | Drevon et al. |
| 2012/0093129 | A1 | 4/2012 | Zhao et al. |
| 2012/0202500 | A1 | 8/2012 | Wu |

OTHER PUBLICATIONS

3GPP; "3rd Generation Partnership Project; Technical Specification Group Services and System Aspects; 3G Security; Security architecture (Release 8)"; 3GPP TS 33.102 V8.4.0 (Sep. 2009) Technical Specification; pp. 1-68; Sep. 2009.

Extended European Search Report in corresponding European Application No. 14156773.5-1870 dated May 8, 2014.

3GPP TR 33.821 V9.0.0 (Jun. 2009) Technical Report; "3rd Generation Partnership Project; Technical Specification Group Services and System Aspects; Rationale and track of security decisions in Long Term Evolved (LTE) RAN/3GPP System Architecture Evolution (SAE) (Release 9)"; Jun. 2009; 144 pages; Valbonne, France.

Alcatel-Lucent; "IMS emergency call handover from UTRAN to EUTRAN for USIMIless UE"; 3GPP TSG-RAN2 #67 meeting; Tdoc R2-094569; XP050352689; Aug. 24-28, 2009; pp. 1-10; Shenzhen, P.R. China.

International Search Report mailed Aug. 19, 2010 in corresponding International Application No. PCT/SE2010/050667.

3rd Generation Partnership Project (3GPP) Technical Report; "IMS emergency call handover from UTRAN to EUTRAN for USIMless UE"; TSG-RAN2#67 meeting; Aug. 24-28, 2009; pp. 1-10; Shenzhen, P.R. China.

3GPP TR 33.821 V9.0.0 Technical Report; "3rd Generation Partnership Project;Technical Specification Group Services and System Aspects; Rationale and track of security decisions in Long Term Evolved (LTE) RAN/3GPP System Architecture Evolution"; (SAE) (Release 9); Jun., 2009; pp. 1-141.

3GPP TS 23.401 V9.4.0 Technical Specification; "3rd Generation Partnership Project;Technical Specification Group Services and System Aspects; General Packet Radio Service (GPRS) enhancements for Evolved Universal Terrestrial Radio Access Network (E-UTRAN) access"; (Release 9); Mar. 2010; pp. 1, 6, 145-151.

3GPP TS 33.102 V8.0.0 Technical Specification; "3rd Generation Partnership Project;Technical Specification Group Services and System Aspects; 3G Security; Security architecture"; (Release 8); Jun. 2006; pp. 1-165.

3GPP TS 33.102 V9.0.0 Technical Report; "3rd Generation Partnership Project;Technical Specification Group Services and System Aspects; 3G Security; Security architecture"; (Release 9); Sep. 2009; pp. 1-70.

3rd Generation Partnership Project (3GPP); "Reply LS on UICCless UE access for IMS emergency call in Rel-9"; TSG-RAN WG2 Meeting #67; Aug. 24-28, 2009; pp. 1; Shenzhen, P.R. China.

3GPP TS 25.413 V8.0.0 Technical Specification; "3rd Generation Partnership Project;Technical Specification Group Radio Access Network; UTRAN Iu interface RANAP signalling"; (Release 8); Sep. 2008; pp. 1-374.

3GPP TS 25.413 V9.0.0 Technical Specification; "3rd Generation Partnership Project;Technical Specification Group Radio Access Network; UTRAN Iu interface Radio Access Network Application Part (RANAP) signalling;" (Release 9); Sep. 2009; pp. 1-400.

International Preliminary Report on Patentability mailed Dec. 27, 2011, in corresponding International Application No. PCT/SE2010/050667.

\* cited by examiner

Fig. 1

1. RRC Connection Request
2. RRC Connection Setup
3. RRC Connection Setup Complete
4. Initial Direct Transfer (Service Request)
RANAP (ps): Initial UE Message (Service Request)
5. Measurement Control (start UTRA measurement)
6. Authentication
7.1 Security Mode Command (CK, IK, etc)
7.2 Security Mode Command
7.3 Security Mode Complete
7.4 Security Mode Complete
8. RAB Establishment
9. Measurement report (bad quality)
10. Configure compressed mode
11. Measurement control (start E-UTRA measurements)
12. Measurement Report (E-UTRA cell)
13. Relocation required (Handover to E-UTRA cell)

METHOD AND ARRANGEMENT IN A TELECOMMUNICATION SYSTEM

FIELD OF THE INVENTION

The present invention relates to Inter RAT handover procedure.

BACKGROUND

The present invention relates to inter RAT (Radio Access Technology) handover in a communication network. Within the scope of 3GPP E-UTRAN, also referred to as Long Term Evolution, LTE, standardization, solutions for Inter RAT handover have been agreed. As used herein, E-UTRAN denotes the cellular radio system developed and standardized by 3GPP, and eNodeB (eNB) denotes a E-UTRAN radio base station node. Such eNodeB could serve multiple E-UTRAN cells.

Functionality to handle user mobility is a fundamental component in cellular networks. From a service quality perspective, such functionality must ensure that service continuity is maintained as users of wireless communication devices move from one cell to another during an active session, and that each new session is established in a sufficiently good radio environment. From a spectral efficiency perspective, such functionality should ensure that an active user is always served by the most appropriate remote radio unit or units, such as an eNodeB for E-UTRAN or an RNC (Radio Network Controller) in UTRAN, which often means the closest remote radio unit, in a radio sense. Thus a handover may have to be performed from time to time, for example as a wireless communication device move between different cells in order to avoid call termination when the wireless communication device gets outside the range of the first cell.

A UTRAN to E-UTRAN Inter RAT handover procedure takes place when the network decides to perform a handover. The decision to perform PS handover from UTRAN to E-UTRAN is taken by the UTRAN Serving RNC (SRNC) and this decision could be based on radio condition measurements reported by a User Equipment, UE, to the SRNC.

The 3GPP TS 23.401, chapter 5.5.2.2, gives an overview of the handover preparation and handover execution signaling at handover from UTRAN to E-UTRAN.

Before deciding of handover to E-UTRAN, the SRNC will check that UE is E-UTRA capable. In addition, such UE may be configured by the SRNC to perform measurements on E-UTRA cells, and for that purpose compressed mode (dependent on UE capability) might have to be configured. Compressed mode is needed when making measurements on another frequency (inter-frequency) or on a different radio technology (inter-RAT). In the Compressed Mode the transmission and reception are stopped for a short time while the measurements are performed on other frequency or RAT in that time. After the measurements are over the transmission and reception resumes. To make sure that the data is not lost, the data is compressed in the frame making empty space where measurements can be performed.

This implies that when a handover is initiated, this has been preceded by a number of steps taken, such as radio resource reconfigurations, measurement reconfigurations, measurements and measurement reports. If the handover to E-UTRA is not allowed for some reason, those steps would be wasted. Instead, other alternative steps (e.g. measurement on other radio technologies, other UTRA frequencies) could have been inhibited while the UE is configured to do measurements on E-UTRA cells. Due to possible UE limitations and/or UTRAN limitations, the SRNC has to select what action to take when the UE measurement result received from UE indicates e.g. bad radio conditions in current UTRA cell/frequency. In addition, when a handover is initiated for radio condition reasons the handover must have high probability for success; otherwise the call might be dropped.

A user operating in a UTRA access system may for example have either a GSM subscription with a UMTS Integrated Circuit Card, UICC, of type SIM (GSM Subscriber Identity Module), or a UMTS subscription with a UICC of type USIM (Universal Subscriber Identity Module). Depending on UICC type, different Authentication and Key Agreement, AKA, algorithms are used. The AKA procedure runs between the Serving GPRS Support Node, SGSN, and the UICC in the UE. It is the SGSN that initiates the AKA procedure and it is normally done at each attach, i.e. each first registration in the serving network, for example at power on. An AKA procedure could also be performed when the UE is already attached. A typical case is at Routing Area update in a new SGSN. The type of AKA performed depends on the security information the SGSN is receiving from the user's HLR/AuC (Home Location Register/Authentication Center) of the user's Home Environment. The security information received from HLR/AuC contains a ciphering key Kc if the user has a GSM subscription, while it contains a ciphering key CK and an integrity protection key IK if the user has a UMTS subscription. At the GSM AKA, which is supported by UICC of type SIM, the ciphering key Kc (64 bits) is generated by the SIM. At the corresponding UMTS AKA, which is supported by UICC of type USIM, the ciphering key CK (128 bits) and the integrity protection key IK (128 bits) are generated by the USIM.

The different AKA algorithms, e.g. the different keys generated and the length of the security keys, gives that the security level for a UE equipped with a UICC of type SIM is considered to be lower than when equipped with a UICC of type USIM.

The SGSN initiates the relevant AKA towards the UE based on information received from the user HLR/AuC (Home Location Register/Authentication Center). The AKA procedure is performed with signaling between UE and SGSN and transparent through UTRAN.

The ciphering and integrity protection of user and control data is performed between UE and SRNC, i.e. the ciphering and integrity algorithms are allocated to UE and SRNC.

The ciphering and integrity protection algorithms, defined for UTRA access, uses security keys of length 128 bits. In order to give support for a user having a GSM subscription (SIM) to get services also in UTRAN, there are two 3GPP defined conversion functions that derives the UMTS ciphering and integrity protection keys (CK and IK) from the 64 bits GSM cipher key (Kc) according to the following, where c4 is the conversion function to obtain CK and c5 is the conversion function to obtain IK:

$$CK[UMTS] = Kc \| Kc; \quad (c4)$$

$$IK[UMTS] = Kc1 \text{ xor } Kc2 \| Kc \| Kc1 \text{ xor } Kc2; \quad (c5)$$

whereby in c5, Kc1 and Kc2 are both 32 bits long and Kc=Kc1∥Kc2.

Thus, when a user/UE with GSM subscription, i.e. holding a UICC of type SIM, is attached to a UTRAN, the UE derives the UMTS ciphering and integrity protection keys CK and IK that are valid for UTRA access from the GSM cipher key Kc using the conversion functions c4 and c5. The security keys are used for the ciphering and integrity protection of user data and control signaling sent between the UE and the SRNC.

The same conversion functions are used by the SGSN. For a UE in connected mode, these derived CK and IK are sent from SGSN to the SRNC when to request start of the ciphering and integrity protection between UE and SRNC.

The 3GPP TS 33.102 gives more detailed information on security functions in UMTS.

3GPP Release 8 does not support any services in E-UTRA to UEs that are not equipped with a UICC of type USIM. Thus, if a UE that has E-UTRAN capability, but is not equipped with a USIM, it will not indicate any support for E-UTRA in its capability information that is sent to the UTRA network. As a consequence, UTRAN will not request the UE to do any E-UTRA measurement and it will not request the UE to perform handover to E-UTRA. Thus, in 3GPP Release 8, a UE without USIM is prevented handover from UTRAN to E-UTRAN because the UE disables its E-UTRAN capability as described in above. This disabling implies that although the UE is capable of E-UTRA access, when it is equipped with a UICC of type SIM it will already at attach inform the network about that it is not E-UTRA capable. This will then not change as long as UE is attached.

However, in 3GPP Release 9, IMS emergency bearer services are supported for both normal service mode and limited service mode UE, i.e. irrespective of which type of UICC the UE is equipped with, or if the UE does not have a UICC at all. The 3GPP SA WG1 LS document R2-094143 Reply LS to R2-094107 on "UICCless UE access for IMS emergency call in Rel-9", states that a UE without USIM making IMS emergency call should be allowed handover from UTRAN to E-UTRAN.

Different solutions to achieve such handover have been discussed (see R2-094569 "IMS emergency call handover from UTRAN to EUTRAN for USIMless UE"), as follows:

Alternative#1 is a network based solution where the SGSN informs the RNC whether the UE has a valid UICC, i.e. a USIM that allows handover to E-UTRAN for non-emergency calls or not. The RNC uses this information to decide whether to do handover to E-UTRAN for a USIM-less UE such that if the UE without USIM is involved in an IMS emergency call, it will allow the handover.

However, alternative#1 requires update of the signaling protocol (RANAP, 3GPP TS 25.413) between SGSN and RNC. The release 8 specifications are frozen, but an RNC based on release 8 protocol specifications should anyhow be able to support release 9 E-UTRA capable UEs.

Alternative#2 is a UE based solution where a USIM-less UE disables the Information Elements, IEs, 'Support of Inter-RAT PS Handover to E-UTRA FDD' and 'Support of Inter-RAT PS Handover to E-UTRA TDD', which are part of the UE capability information sent from the UE to the SRNC, and only enables them when emergency call is setup but disables them again when the emergency call is terminated. Thus, the USIM-less UE toggles its E-UTRAN capabilities based on the RRC states it is in and whether emergency call is present.

Alternative#2 might however cause a lot of signaling between UE and network due to the fact that the UE needs to send new UE capabilities to the network each time it will perform an emergency call and once again at the end of the emergency call. This might lead to inconsistency but also it will be an inflexible solution since in the future there might be other services than just emergency calls where handover to E-UTRAN can be made allowed. Thus there might be other needs and other types of restrictions in the future when the network (UTRAN) needs to know the UICC type.

Thus, a network solution is preferred, and if possible a solution that does not require any change of signaling protocols between network nodes.

SUMMARY

It is therefore desirable to provide a method and arrangement that solves or mitigates the above described drawbacks of the known solutions.

In UTRAN it is the SRNC that initiates the measurements on E-UTRA cells and also takes the decision on handover. The SRNC has knowledge on the type of calls/bearers that are setup for a UE, for example, the SRNC has knowledge about when an emergency call is setup or not for a UE.

In order to prevent the SRNC to start E-UTRA measurements in a UE that is not allowed to perform handover to E-UTRAN, i.e that does not have a UICC valid for E-UTRA such as a USIM, and to prevent initiation of handover resource allocation signaling in the network for such UE there is a need for the SRNC to know which type of UICC the UE has, for example if there is a USIM or not in the UE.

Currently there is no information on how the RNC can identify the type of UICC in the UE, and therefore embodiments of the present invention aim to provide a solution to this problem.

A first aspect of embodiments of the present invention relates to a method in a serving Radio Network Controller, SRNC, for controlling inter RAT handover to E-UTRAN of a UE with E-UTRA capability operating in a serving network comprising said SRNC, wherein the SRNC receives, from a Serving GPRS Support Node, SGSN, security keys generated at authentication and key agreement, AKA. The method comprises the steps of determining which subscription that is provided to the UE by the UICC that the UE is equipped with by analyzing the security keys received from SGSN, utilizing properties of key conversion functions known to the SRNC ;

using the knowledge of which subscription that is provided to the UE by the UICC that the UE is equipped with to base a decision on whether to allow handover of the UE to E-UTRAN.

According to a specific embodiment, the method comprises the step of allowing handover of the UE to E-UTRAN to be initiated if the UE has a UICC providing a subscription valid for E-UTRAN or if at least one condition relating to the type of said UE's ongoing service is fulfilled.

In a specific embodiment, the method comprises the steps of allowing handover of the UE to E-UTRAN to be initiated if at least one of the following conditions are fulfilled:

the UE has a UICC providing a subscription valid for E-UTRAN, or the UE has an ongoing emergency call, otherwise, not allowing inter RAT handover of the UE to E-UTRAN.

Thus, according to specific embodiments, if the UE does not have a UICC valid for E-UTRAN, the SRNC checks if the UE has an ongoing service for which handover to E-UTRAN is allowed, for example an emergency call.

According to a specific embodiment, the security keys received from SGSN are analyzed by applying conversion functions known to the SRNC, said conversion functions being defined for deriving security keys that are valid for accessing the serving network from a non valid security key.

In a specific embodiment, the Inter RAT handover is a handover from UTRAN to E-UTRAN, and wherein security keys defined for UTRA access, generated by a UICC that provides an UMTS subscription, are a ciphering key (CK) of 128 bits and an integrity protection key (IK) of 128 bits, whereby a ciphering key (Kc) generated by a UICC that provides a GSM subscription may be converted to said security keys defined for UTRA access by the following conversion functions:

$$CK = Kc \| Kc$$

$$IK = Kc1 \text{ xor } Kc2 \| Kc \| Kc1 \text{ xor } Kc2.$$

In a specific embodiment, the step of determining which subscription that is provided by the UICC that a UE with E-UTRA capability is equipped with comprises
- checking if the CK received from SGSN consist of two identical 64 bit Kc in accordance with equation c4,
- if not, concluding that the UE is equipped with a UICC that provides and UMTS subscription; otherwise,
- calculating a test value following equation c5, where Kc=Kc1∥Kc2 is one of the two identical 64-bit Kc and Kc1 and Kc2 are both 32 bits long, such that if the test value equals IK received from SGSN, then concluding that the UE is equipped with a UICC that provides a GSM subscription, otherwise, concluding that the UE is equipped with a UICC that provides an UMTS subscription.

A second aspect of embodiments of the invention relates to an arrangement in a Radio Network Controller, RNC, capable of controlling inter RAT handover to E-UTRAN of a UE with E-UTRA capability operating in a serving network comprising said RNC, comprising an interface for communicating with a Serving GPRS Support Node, SGSN, said interface being adapted to receive, from the SGSN, security keys generated at authentication and key agreement, AKA. Said arrangement comprises a processing unit capable of
- determining which subscription that is provided to the UE by the UICC that the UE is equipped with by analyzing the security keys received from SGSN;
- using the knowledge of which subscription that is provided to the UE by the UICC that the UE is equipped with to base a decision on whether to allow handover of the UE to E-UTRAN.

Thus, a particular embodiment provide a method in a Serving Radio Network Controller, SRNC, for determining the type of UICC, UMTS Integrated Circuit Card in a UE by using security keys such as CK and IK and specified conversion functions that are applied when an authentication and key agreement, AKA, such as GSM AKA, has been performed, for determining which type of UICC the UE has, for example a USIM or a SIM.

In particular embodiments of the present invention it is assumed that a UE with SIM in use is allowed to indicate E-UTRA capability in UTRA access.

The information related to UICC type, i.e. subscription provided by the UICC, may be used by the SRNC to decide if an E-UTRAN capable UE shall be configured to perform E-UTRA cell measurements and if handover to an E-UTRA cell may be initiated. This gives a possibility for SRNC to limit the configuration of E-UTRA cell measurements and handover from UTRA to E-UTRA to those UEs that are E-UTRA capable and either have an ongoing service of a type for which handover to E-UTRAN is allowed, such as an emergency call as specified for E-UTRA Rel. 9, or those UEs that have an ongoing service of any type, such as a non-emergency call, and have a USIM. Thus, UEs that for example holds a UICC of SIM type may be prevented from preparing and initiating inter RAT handover to E-UTRAN, or alternatively, in case there is for example an on-going emergency call, may be allowed to prepare and initiate inter RAT handover to E-UTRAN.

Another aspect of particular embodiments of the invention relates to an RNC capable of acting as a serving RNC, SRNC, for a UE attached to said RNC. The RNC according to particular embodiments of the invention comprises a processor configured to determine the type of UICC, UMTS Integrated Circuit Card in a UE by using security keys such as CK and IK and specified conversion functions that are applied when an authentication and key agreement, AKA, such as GSM AKA, has been performed.

Other objects, advantages and novel features of the invention will become apparent from the following detailed description of the invention when considered in conjunction with the accompanying drawings.

DETAILED DESCRIPTION

The present invention can be exemplified in the following non-limiting description of an embodiment of the invention. In the following description, it is referred to a scenario relating to a handover from UTRAN to E-UTRAN, where the UMTS ciphering and integrity protection keys, CK, IK, are received by a serving RNC from a serving GPRS support node.

It should however be noted that the invention should not be seen as limited to these specific keys. In another scenario the principle according to particular embodiments of the inventions may be applied for other keys generated at authentication and key agreement at attachment of the UE to a serving network.

Figure 1:
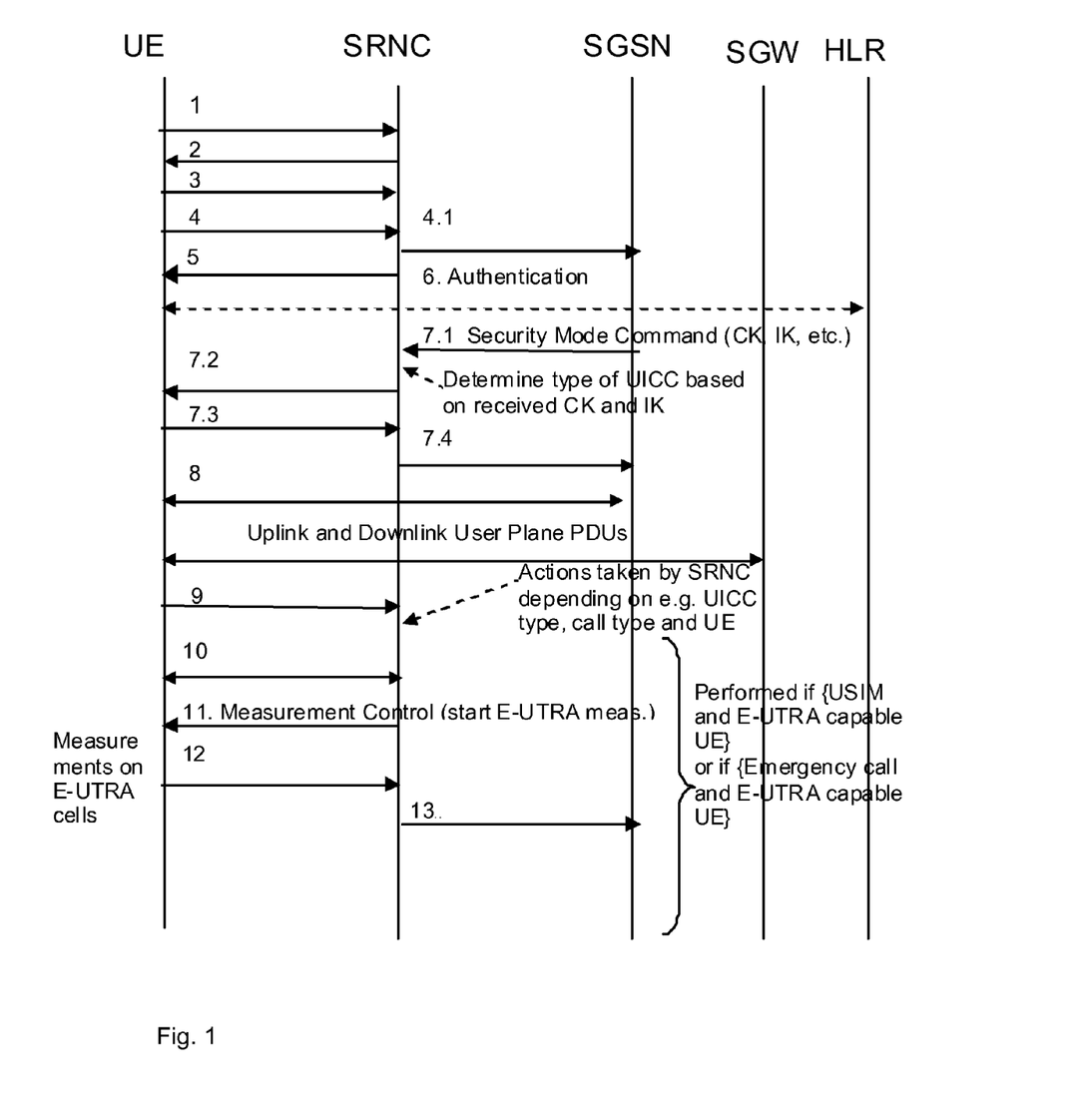
FIG. 1 illustrates a signaling flow in relation to which embodiments of the invention may be applied.

FIG. 1 illustrates a scheme of signaling that will be referred to in the following detailed description of particular embodiments of the invention.

The authentication procedure, represented by step 6 in FIG. 1, is preceded by known steps 1-5 relating to connection setup at attachment of the UE to the network. These preceding steps are not directly relevant for the present invention and will therefore not be discussed any further herein.

According to prior art represented by e.g. 3GPP TS 33.102, at start of security functionality, i.e. ciphering of user and control data and integrity protection of control data between UE and SRNC, for a UE connection, the SGSN sends the UMTS ciphering key CK and the UMTS integrity protection key IK to the SRNC in a Security Mode Command, see step 7.1 in FIG. 1. The start of security functionality is done once the UE has a signaling connection between UE and SGSN after a new AKA procedure. Both keys CK, IK, are 128 bits each. The ciphering and integrity algorithms are allocated in SRNC and UE. Together with the CK and IK, the SRNC furthermore receives, from SGSN, information on the allowed security algorithms to be used. According to prior art, no information on what type of UICC the UE holds is provided from the SGSN to the SRNC.

According to particular embodiments of the present invention, the SRNC, after receiving the keys CK, IK from SGSN, identifies the UE's type of UICC for a UE connection by use of the security keys CK and IK received from the SGSN in the SECURITY MODE COMMAND message. This may be done by utilizing properties of key conversion functions known to the SRNC, said key conversion functions may have been used by the SGSN and the UE to derive keys that are valid for the serving network. The key conversion functions may be GSM to UMTS key conversion functions specified in 3GPP TS 33.102.

According to particular embodiments of the invention, the SRNC uses the knowledge about whether the UE has a USIM or not, together with other type of information such as UE capability and the ongoing call types, to base its decision on whether to configure the UE to do the E-UTRA cell measurements, see step 11-12 in FIG. 1, and/or to initiate handover towards E-UTRAN, see step 13 in FIG. 1, based on measurement reports indicating bad quality, see step 9 in FIG. 1. It should be noted that it may not be mandatory to perform E-UTRA cell measurements before handover to E-UTRA is initiated. Such handover decision could also be taken based on UTRA cell measurements e.g. in case a UTRA cell and an E-UTRA cell have overlapping coverage.

A method according to an embodiment of the invention performed by a Serving RNC, SRNC, will now be described with reference to FIG. 2. It should be noted that the method steps may be performed in a somewhat different chronological order than the enumeration suggests and that some of them, e.g. steps 202 and 203 may be performed in a rearranged chronological order.

In step 201, the SRNC receives the UMTS ciphering key CK and the UMTS integrity protection key CK from the SGSN in a Security Control Command, said keys are to be used for ciphering and integrity protection of user data and control signaling sent between a UE and the SRNC.

In step 202, the SRNC determines which type of UICC the UE holds, i.e. which subscription that is provided to the UE by the UICC, by analyzing the security keys received from SGSN.

This may be done by utilizing properties of key conversion functions known to the SRNC.

According to TS 33.102, section 6.8.2.4, a R99+ VLR/SGSN (R99+refers to a network node or UE that conforms to 3GPP Release 99 or later specifications) and a UE with SIM inserted shall derive the UMTS cipher/integrity keys CK and IK from the GSM cipher key using the following conversion functions:

$$CK[UMTS]=Kc\|Kc; \quad \text{(equation c4)}$$

$$IK[UMTS]=Kc1 \text{ xor } Kc2\|Kc\|Kc1 \text{ xor } Kc2; \quad \text{(equation c5)}$$

whereby in c5, Kc1 and Kc2 are both 32 bits long and Kc=Kc1∥Kc2.

For the introduction of an identification of UICC type the SRNC makes the following check:
Does the CK as received from SGSN consist of two identical 64-bit Kc (according to equation c4), i.e, is the 64 least significant bits of CK identical to the 64 most significant bits of CK?
If No: UE uses USIM.
If Yes: Calculate a test value following the formula for calculating an IK from a Kc, i.e. the c5 function, as follows:
test value=Kc1 xor Kc2∥Kc∥Kc1 xor Kc2
where Kc=Kc1∥Kc2 is one of the two identical 64-bit Kc above and Kc1 and Kc2 are both 32 bits long.
If test value equals IK received from SGSN, then
UE uses SIM,
else
UE uses USIM.

USIM is as previously mentioned an UICC that is valid for E-UTRAN.

In step 203, the SRNC receives information from the UE, for example in a measurement report, that the UE experiences bad radio quality, indicating that a handover may be necessary.

If handover to E-UTRAN is the most appropriate alternative, and the UE is E-UTRA capable, the SRNC will check, in step 204, if the UE holds a UICC that is valid for E-UTRAN. This is done by analyzing the security keys received from SGSN, for example by using the conversion functions c4 and c5 as described in the foregoing.

If the UE holds a UICC that is valid for E-UTRAN, the SRNC may initiate handover to E-UTRAN according to step 205.

If the UE does not hold a UICC valid for E-UTRAN, the SRNC may, according to particular embodiments, further check, in step 206, if the UE's ongoing service is of a type for which handover to E-UTRAN is allowed independently of which type of UICC the UE holds. Such service may for example be an emergency call.

If the service that the UE is using is of a type for which handover to E-UTRAN is allowed independently of which type of UICC the UE holds, the SRNC may initiate handover to E-UTRAN according to step 205.

Otherwise, the SRNC will according to step 207 not initiate handover to E-UTRAN for said UE, thereby saving resources that otherwise would have been spent by the UE on E-UTRA measurements.

Figure 3:
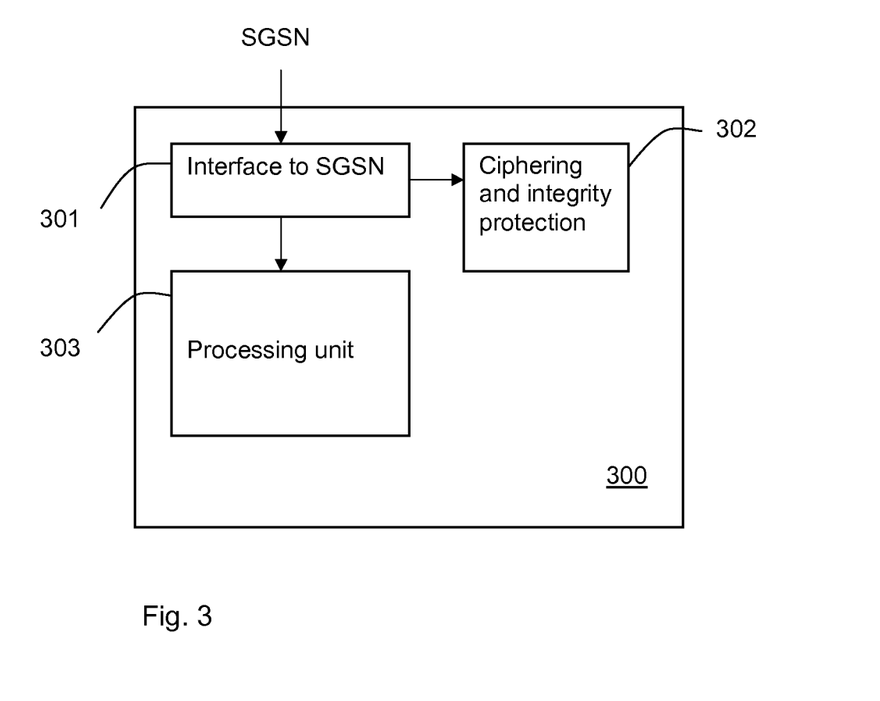
FIG. 3 shows schematically an arrangement in an RNC according to an embodiment of the invention.

FIG. 3 illustrates schematically an arrangement 300 in an RNC according to a particular embodiment of the invention, said RNC being capable of acting as serving RNC for a UE with E-UTRA capability in a cellular communications network. Said RNC is capable of controlling inter RAT handover to E-UTRAN of said UE. It should be noted that any internal electronics of the arrangement not needed for understanding the method and arrangement according to the embodiments of the invention has been omitted from FIG. 3 for clarity reasons. It should also be noted that the described units comprised within the arrangement 300 are to be regarded as logical entities and not with necessity as separate physical entities.

Said arrangement 300 comprises an interface 301 for communicating with a Serving GPRS Support Node, SGSN, said interface 301 being adapted to receive, from the SGSN, security keys generated at authentication and key agreement, AKA, upon attachment of the UE to the serving network. Said security keys may be the UMTS ciphering key CK and the UMTS integrity protection key IK.

The arrangement may furthermore comprise a ciphering and integrity protection unit 302 for handling of ciphering and integrity protection, using the received security keys, of user data and control signaling sent between RNC and the UE when the RNC is acting as Serving RNC for said UE.

The arrangement furthermore comprises a processing unit 303 capable of determining which type of UICC the UE is equipped with by analyzing the security keys received from SGSN, and using the knowledge of which type of UICC the UE is equipped with to base a decision on whether to allow handover of the UE to E-UTRAN.

Figure 2:
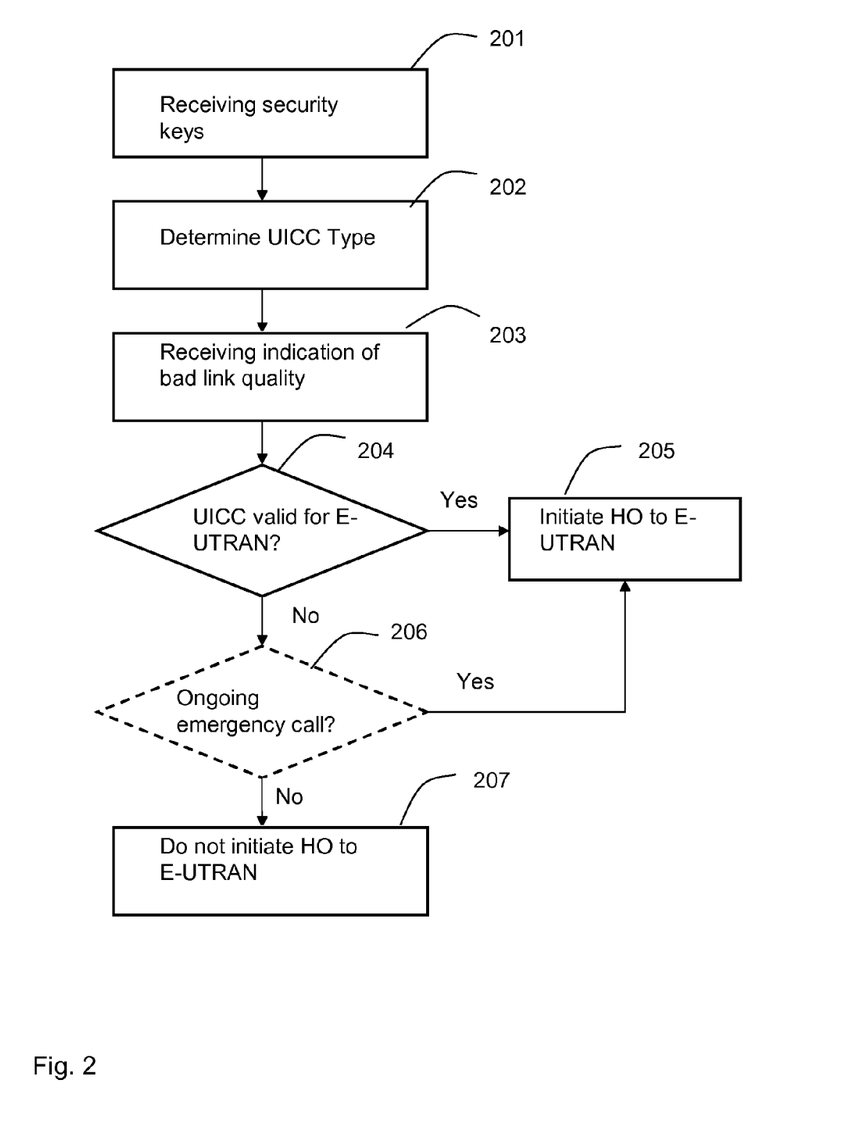
FIG. 2 shows a flow chart illustrating a method according to an embodiment of the invention.

As previously described for the method illustrated in FIG. 2, this may be done by utilizing properties of key conversion functions known to the SRNC as described in the foregoing.

Embodiments of the invention thus gives the SRNC the possibility to limit the configuration of E-UTRA cell measurements (step 11-12 in FIG. 1) and handover (FIG. 1, step 13) from UTRA to E-UTRA to those UEs that have an ongoing call of a certain type, such as an emergency call and is E-UTRA capable, and to those UEs that have an ongoing call of any type, such as a non-emergency call, is E-UTRA capable and has a USIM.

Embodiments of the invention thus provides a solution for how the UTRAN can identify type of UICC in the UE, and this knowledge gives the flexibility for the network to initiate UE measurements and perform UTRAN to E-UTRAN handover for a E-UTRA capable UE based on type of ongoing UE call/services.

This possibility can be provided without change of Layer 3, L3, signaling, i.e. based on the release 8 3GPP standards.

The present invention may, of course, be carried out in other ways than those specifically set forth herein without departing from essential characteristics of the invention. The present embodiments are to be considered in all respects as illustrative and not restrictive.

ABBREVIATIONS

3GPP Third Generation Partnership Program
AKA Authentication and Key Agreement
AUC Authentication Center
CK Cipher Key
E-UTRA Evolved UTRA
E-UTRAN Evolved UTRAN
GSM Global System for Mobile communications
HLR Home Location Register
IK Integrity key
Kc Ciphering key
MME Mobile Management Entity
PS Packet Services
RAT Radio Access Technology
RNC Radio Network Controller
RRC Radio Resource Control
SRNC Serving RNC
SGSN Serving GPRS Support Node
SGW Serving Gateway
SIM GSM Subscriber Identity Module
UE User Equipment
UICC UMTS Integrated Circuit Card
UMTS Universal Mobile Telecommunications System
USIM Universal Subscriber Identity Module
UTRA UMTS Terrestrial Radio Access
UTRAN UMTS Terrestrial Radio Access Network
VLR Visitor Location Register

The invention claimed is:

1. A method in a serving Radio Network Controller (SRNC), comprising:
controlling an inter Radio Access Technology (RAT) handover to Evolved Universal Terrestrial Access Network (E-UTRAN) of a User Equipment (UE) with Evolved Universal Terrestrial Access (E-UTRA) capability operating in a serving network comprising said SRNC, wherein the SRNC receives, from a Serving GPRS Support Node (SGSN), security keys generated at Authentication and Key Agreement (AKA) upon attachment of the UE to the serving network, wherein the controlling includes:
determining which subscription that is provided to the UE by a UMTS Integrated Circuit Card (UICC) that the UE is equipped with by analyzing the security keys received from SGSN; and
using the knowledge of which subscription that is provided to the UE by the UICC that the UE is equipped with to base a decision on whether to allow handover of the UE to E-UTRAN, wherein the step of determining which subscription that is provided to the UE by the UICC that the UE is equipped with comprises:
checking when a ciphering key (CK) received from SGSN consist of two identical 64 bit ciphering keys (Kc) in accordance with the function CK=Kc||Kc, and
when not, concluding that the UE is equipped with a UICC that provides a UMTS subscription; otherwise,
calculating a test value in accordance with the function IK=Kc1 xor Kc2||Kc||Kc1 xor Kc2, where Kc=Kc1||Kc2 is one of the two identical 64-bit Kc and Kc1 and Kc2 are both 32 bits long, such that if the test value equals IK received from SGSN, then concluding that the UE is is equipped with a UICC that provides a GSM subscription, otherwise, concluding that the UE is equipped with a UICC that provides a UMTS subscription.

2. The method according to claim 1, comprising the step of allowing handover of the UE to E-UTRAN to be initiated when the UE has a UICC providing a subscription valid for E-UTRAN or when at least one condition relating to the type of said UE's ongoing service is fulfilled.

3. The method according to claim 1, comprising the steps of:
allowing handover of the UE to E-UTRAN to be initiated when at least one of the following conditions are fulfilled:
the UE has a UICC providing a subscription valid for E-UTRAN, or
the UE has an ongoing emergency call, otherwise,
not allowing inter RAT handover of the UE to E-UTRAN.

4. The method according to claim 1, wherein the security keys received from SGSN are analyzed by applying conversion functions known to the SRNC, said conversion functions being defined for deriving security keys that are valid for accessing the serving network from a non-valid security key.

5. The method according to claim 1, wherein the Inter RAT handover is a handover from UTRAN to E-UTRAN.

6. The method according to claim 5, wherein security keys defined for UTRA access, generated by a UICC of type USIM, are a ciphering key (CK) of 128 bits and an integrity protection key (IK) of 128 bits, whereby a ciphering key (Kc) generated by a UICC of type SIM may be converted to said security keys defined for UTRA access by $$CK=Kc||Kc \text{ and}$$

$$IK=Kc1 \text{ xor } Kc2||Kc||Kc1 \text{ xor } Kc2.$$

7. A Radio Network Controller (RNC) that controls an inter Radio Access Technology (RAT) handover of a User Equipment (UE) with Evolved Universal Terrestrial Access (E-UTRA) capability from a serving network to an Evolved Universal Terrestrial Access Network (E-UTRAN), said RNC, comprising:
an interface for communicating with a Serving GPRS Support Node (SGSN), said interface being adapted to receive, from the SGSN, security keys generated at Authentication and Key Agreement (AKA) upon attachment of the UE to the serving network; and
comprising a processing unit a hardware processor capable of:
determining which subscription that is provided to the UE by a UMTS Integrated Circuit Card (UICC) that the UE is equipped with by analyzing the security keys received from SGSN; and using the knowledge of which subscription that is provided to the UE by the UICC that the UE is equipped with to base a decision on whether to allow handover of the UE to the E-UTRAN, wherein the processor capable of determining which subscription that is provided to the UE by the UICC that the UE is equipped with is configured to:

check when the CK received from SGSN consist of two identical 64bit ciphering keys (Kc) in accordance with the function CK=Kc∥Kc, and when not, conclude that the UE is equipped with a UICC that provides a UMTS subscription; otherwise, calculate a test value in accordance with the function IK=Kc1 xor Kc2∥Kc∥Kc1 xor Kc2, where Kc=Kc1∥Kc2 is one of the two identical 64-bit Kc and Kc1 and Kc2 are both 32 bits long, such that if the test value equals IK received from SGSN, then concluding that the UE is equipped with a UICC that provides a GSM subscription, otherwise, concluding that the UE is equipped with a UICC that provides a UMTS subscription.

8. The RNC according to claim 7, wherein said processor is configured to allow handover of the UE to E-UTRAN to be initiated when the UE has a UICC providing a subscription valid for E-UTRAN or when at least one condition relating to the type of said UE's ongoing service is fulfilled.

9. The RNC according to claim 7, wherein said processor is configured to:

allowing handover of the UE to E-UTRAN to be initiated when at least one of the following conditions are fulfilled:

the UE has a UICC providing a subscription valid for E-UTRAN, or the UE has an ongoing emergency call, otherwise, not allowing inter RAT handover of the UE to E-UTRAN.

10. The RNC according to claim 7, wherein said processor is configured to analyze the security keys received from SGSN by applying conversion functions known to the SRNC, said conversion functions being defined for deriving security keys that are valid for accessing the serving network from a non-valid security key.

11. The RNC according to claim 7, wherein the RNC is capable of controlling inter RAT handover from UTRAN to E-UTRAN.

12. The RNC according to claim 11, wherein security keys defined for UTRA access, generated by a UICC of type USIM, are a ciphering key (CK) of 128 bits and an integrity protection key (IK) of 128 bits, whereby a ciphering key (Kc) generated by a UICC of type SIM may be converted to said security keys defined for UTRA access by $CK=Kc\|Kc$ and $IK=Kc1 \text{ xor } Kc2\|Kc\|Kc1 \text{ xor } Kc2.$

* * * * *